United States Patent
Zhong (10) Patent No.: US 11,586,409 B1
(45) Date of Patent: Feb. 21, 2023

(54) WIRELESS CONFERENCING SYSTEM AND COLLABORATION METHOD THEREOF

(71) Applicant: SHENZHEN VIEWPLAY CO., LTD., Shenzhen (CN)

(72) Inventor: Yi Zhong, Shenzhen (CN)

(73) Assignee: SHENZHEN VIEWPLAY CO., LTD., Shenzhen (CN)

( * ) Notice: Subject to any disclaimer, the term of this patent is extended or adjusted under 35 U.S.C. 154(b) by 0 days.

(21) Appl. No.: 17/488,315

(22) Filed: Sep. 29, 2021

(30) Foreign Application Priority Data

Sep. 8, 2021 (CN) .......................... 202111047771.2

(51) Int. Cl.
*G06F 3/14* (2006.01)
*H04L 12/18* (2006.01)
*H04L 9/40* (2022.01)

(52) U.S. Cl.
CPC ............ *G06F 3/1454* (2013.01); *H04L 12/18* (2013.01); *H04L 63/0209* (2013.01); *H04L 63/083* (2013.01)

(58) Field of Classification Search
CPC .............. G06F 3/1454; G09G 2370/16; H04N 21/43637; H04N 7/155; H04N 7/147; H04L 12/1813; H04L 12/1818; H04L 12/1827; H04L 12/1822; H04L 12/1831; H04M 3/567
See application file for complete search history.

(56) References Cited

U.S. PATENT DOCUMENTS

| | | | |
|---|---|---|---|
| 10,673,641 B2* | 6/2020 | Rose | H04W 4/80 |
| 2009/0237353 A1* | 9/2009 | Chu | G06F 3/147 |
| | | | 345/156 |
| 2010/0299712 A1* | 11/2010 | Austin | H04N 21/43637 |
| | | | 710/63 |
| 2016/0350058 A1* | 12/2016 | Zhu | H04N 21/4126 |

* cited by examiner

*Primary Examiner* — Koosha Sharifi-Tafreshi
(74) *Attorney, Agent, or Firm* — Raymond Y. Chan; David and Raymond Patent Firm (57) ABSTRACT

A wireless conferencing system for wirelessly connecting a computerized device with a display device includes at least a data transmitter. The data transmitter includes a transmitter self-powered unit, a data transmission module electrically powered by the transmitter self-powered unit, and a computer interface communicatively lined to the data transmission module, wherein when the computer interface is configured for detachably connecting to the computerized device, the data transmission module is powered and ready for wirelessly transmitting data from the computerized device to the display device without consuming power of the computerized device.

28 Claims, 7 Drawing Sheets

WIRELESS CONFERENCING SYSTEM AND COLLABORATION METHOD THEREOF

CROSS REFERENCE OF RELATED APPLICATION

This is a non-provisional application that claims priority under 35 U.S.C. § 119 to a Chinese application number 2021110477712, filing date Sep. 8, 2021, the entire content of which is expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a display system, and more particularly to a wireless conferencing system and collaboration method thereof, which comprises a self-powered data transmitter adapted for connecting to a computerized device for at least wirelessly transmitting data to a display device without consuming power of the computerized device.

Description of Related Arts

With the growing demand for communication, the effectiveness of data transmission between different computerized devices has been advanced to improve the usability of a user especially during the conference, meeting or presentation. Traditionally, the computerized devices are communicatively connected by a cable for data transmission. For example, during a conference or a presentation, a host computer such as notebook, smart phone or tablet, is connected to a display device, such as monitor, TV or projector, by a HDMI cable, such that information data, video data, audio data and the like can be effectively transmitted from the host computer to the display screen. However, such wire connecting configuration has several drawbacks. For example, the connection distance between the host computer and the display device is limited by the length of the HDMI cable. Only one host computer is connected to the display device by one cable. For connecting multiple computers, multiple cables must be used and the wiring configuration becomes complicated. Furthermore, it requires additional software and/or hardware for sharing files or data between the computers.

An improved data transmission system is to wirelessly connect between computers, or between the computers and the display device via a wireless network. For example, the host computer can be wirelessly connected to a "WiFi" network for transmitting the data to different computers and/or display device through the "WiFi" network. However, all computers are all susceptible to the wireless security risks. Especially when the computer is allowed for file sharing across the "WiFi" network, even a private network, any infected software can be easily planted on the computer, and the computer can be easily hacked.

Another wireless connection is established by connecting a wireless transmitter to the computer and connecting a wireless receiver at the display device, for example U.S. Pat. Nos. 7,949,609, 8,493,992, 9,160,975, 9,578,336, 10,585,814, 10,693,924, and US20100066806, wherein when the wireless transmitter and the wireless receiver are wirelessly connected, the data can be wirelessly transmitted from the computer to the display device. In one example, the wireless transmitter is incorporated with a USB interface and the wireless receiver is incorporated with a HDMI interface. It is known that the USB interface is an interface for computer connection, and is not a data transmission interface. In other words, corresponding software must be installed into the computer for data transmission through the USB interface. Particularly, the software is the encoding software for encoding the video data, audio data and the like after transmitting to the display device. As a result, the host computer must be installed with the encoding software before the conference. It is unsafe to install any unknown software into the computer. Furthermore, the wireless transmitter is not a self-powered device, such that the wireless transmitter requires withdrawing power from the computer to shorten the battery life of the computer. It will be an annoying situation that the host notebook computer ran out of power halfway through the presentation. Also, there is no information to the speaker that how much power will be consumed by the wireless transmitter plugged in the host computer.

In addition, the wireless receiver is merely a receiving terminal that only receives data from the wireless transmitter. In other words, the controlling operation is a unidirectional operation, wherein the display device does not provide any controlling ability. Another drawback of the wireless transmitter and wireless receiver is the compatible problem. Such connection may not compatible with different operation systems, such as "Window", "Android" or "IOS" operation system.

SUMMARY OF THE PRESENT INVENTION

The invention is advantageous in that it provides a wireless conferencing system and collaboration method thereof, wherein the wireless conferencing system comprises a self-powered data transmitter adapted for connecting to a computerized device for wirelessly transmitting data to a display device without consuming power of the computerized device electrically connected therewith.

Another advantage of the invention is to provide a wireless conferencing system and collaboration method thereof, wherein the data transmitter can be charged by an external battery unit at the same time when the data transmitter is connected to the computerized device without interfering the transmission operation of the data transmitter.

Another advantage of the invention is to provide a wireless conferencing system and collaboration method thereof, wherein the wireless conferencing system comprises a self-powered data receiver adapted for connecting to the display device for wirelessly receiving the data from the data transmitter without consuming power of the display device.

Another advantage of the invention is to provide a wireless conferencing system and collaboration method thereof, wherein no software is required for pre-installing into the computerized device in order to incorporate with the data transmitter for data transmission.

Another advantage of the invention is to provide a wireless conferencing system and collaboration method thereof, wherein the wireless conferencing system comprises an interface adapter coupling at the data transmitter to alter a connection interface, such as HDMI to USB interface. The data transmitter can also be charged by the interface adapter.

Another advantage of the invention is to provide a wireless conferencing system and collaboration method thereof, wherein the data transmitter is also configured to receive a control signal from the data receiver when the data receiver is connected to a touch-screen control device.

Another advantage of the invention is to provide a wireless conferencing system and collaboration method thereof, wherein when two or more of the date transmitters are provided, one of the data transmitters can serve as a laser pointer or a remote controller for controlling the computerized device connected to another data transmitter.

Another advantage of the invention is to provide a wireless conferencing system and collaboration method thereof, wherein when two or more of the date receivers are provided, the data receivers are adapted to be interconnected via a closed private network or other wireless networks.

Another advantage of the invention is to provide a wireless conferencing system and collaboration method thereof, wherein the data transmission channel is easily formed by simply connecting the data transmitter and the data receiver to computerized device and the display device respectively.

Another advantage of the invention is to provide a wireless conferencing system and collaboration method thereof, which does not require to alter the original configurations of the computerized device and the display device, so as to minimize the manufacturing cost of the computerized device and the display device incorporating with the wireless conferencing.

Another advantage of the invention is to provide a wireless conferencing system and collaboration method thereof, wherein no expensive and complicated structures are required to be employed in the present invention in order to achieve the above mentioned objects. Therefore, the present invention successfully provides an economic and efficient solution for creating a data transmission channel between the computerized device and the display device without consuming the powers thereof.

Additional advantages and features of the invention will become apparent from the description which follows, and may be realized by means of the instrumentalities and combinations particular point out in the appended claims.

According to the present invention, the foregoing and other objects and advantages are attained by a wireless conferencing system for wirelessly connecting at least one computerized device with at least one display device, comprising one or more data transmitters, wherein each of the data transmitters comprises:

a transmitter self-powered unit, a data transmission module electrically powered by the transmitter self-powered unit, and a computer interface communicatively lined to the data transmission module, wherein when the computer interface is configured for detachably connecting to the computerized device, the data transmission module is powered and ready for wirelessly transmitting data from the computerized device to the display device without consuming power of the computerized device.

In accordance with another aspect of the invention, the present invention comprises a conferencing collaboration method for wirelessly connecting at least one computerized device with a display device, comprising the following steps.

(A) Connect a data transmitter to the computerized device to form a transmitting terminal by the following steps.

(A.1) Connect a computer interface of the data transmitter to the computerized device.

(A.2) Power a data transmission module of the data transmitter by a transmitter self-powered unit thereof.

(B) Via the data transmission module, wirelessly transmit data from the computerized device to the display device without consuming power of the computerized device.

(C) Connect a data receiver to the display device to form a receiving terminal by the following steps.

(C.1) Connect a display interface of the data receiver to the display device.

(C.2) Power a data receiving module of the data receiver by a receiver self-powered unit thereof or by the display device to receive the data transmitted from the data transmission module of the data transmitter.

In one embodiment, the step (C) further comprises the following step:

(C.3) Save the last data displayed on the display device by the data receiver when the data transmitter is powered off or detached from the computerized device.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1 to 6, a wireless conferencing system according to a preferred embodiment of the present invention, wherein the wireless conferencing system is configured for wirelessly connecting at least one computerized device 100 with at least one display device 200. The wireless conferencing system according to the preferred embodiment of the present invention comprises one or more data transmitters 10, one or more data receivers 20, and a control base 30.

Figure 3:
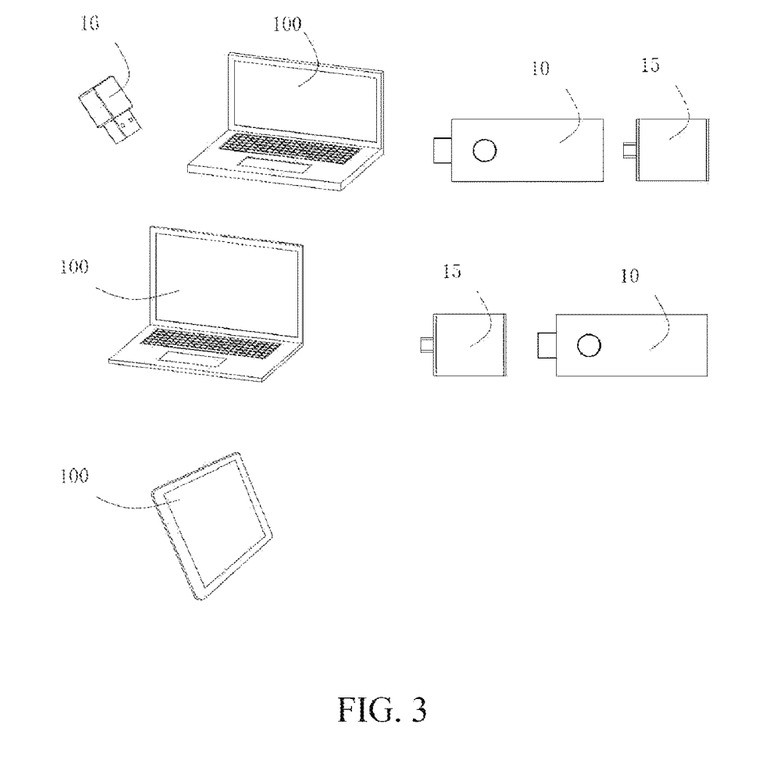
FIG. 3 illustrates the data transmitters connecting to different computerized devices according to the above preferred embodiment of the present invention.

According to the preferred embodiment, the data transmitter 10 is configured to be detachably connected to the computerized device 100 to form a transmitting terminal. In one embodiment, the computerized device 100 is embodied as a personal computer, a notebook computer, a smart device, or a tablet computer. Preferably, two or more data transmitters 10 are connected to different computerized devices 100 respectively, as shown in FIG. 3.

Figure 2:
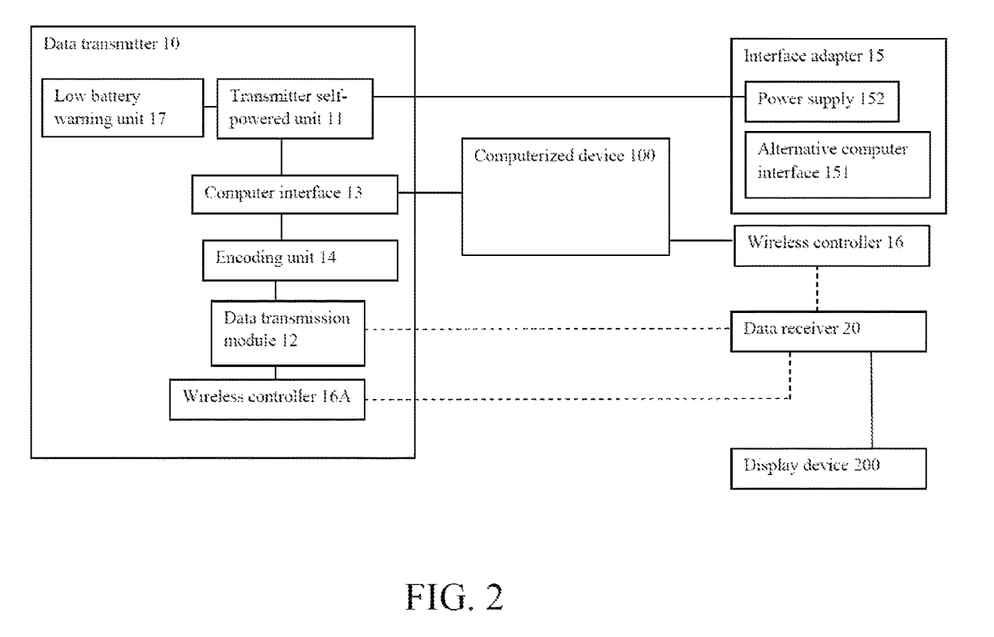
FIG. 2 is a block diagram of a data transmitter of the wireless conferencing system according to the above preferred embodiment of the present invention.

As shown in FIG. 2, each of the one or more data transmitters 10 comprises a transmitter self-powered unit 11, a data transmission module 12 electrically powered by the transmitter self-powered unit 11, and a computer interface 13 communicatively linked to the data transmission module 12. The data transmitter 10 which is configured to have a compact size such as thumb size comprises an elongated housing 10A configured to house the transmitter self-powered unit 11, the data transmission module 12, and the computer interface 13. According to the preferred embodiment of the present invention, a connecting terminal of the computer interface 13 is extended from a first end of the housing 10A of the data transmitter 10. When the computer interface 13 is configured for detachably connecting to the computerized device 100, the data transmission module 12 is powered and ready for wirelessly transmitting data from the computerized device 100 to the display device without consuming power of the computerized device 100. In other words, the data transmitter 10 is a self-powered transmitting device which does not need to draw electrical power from the computerized device 100 when operating the data transmitter 10.

Figure 6:
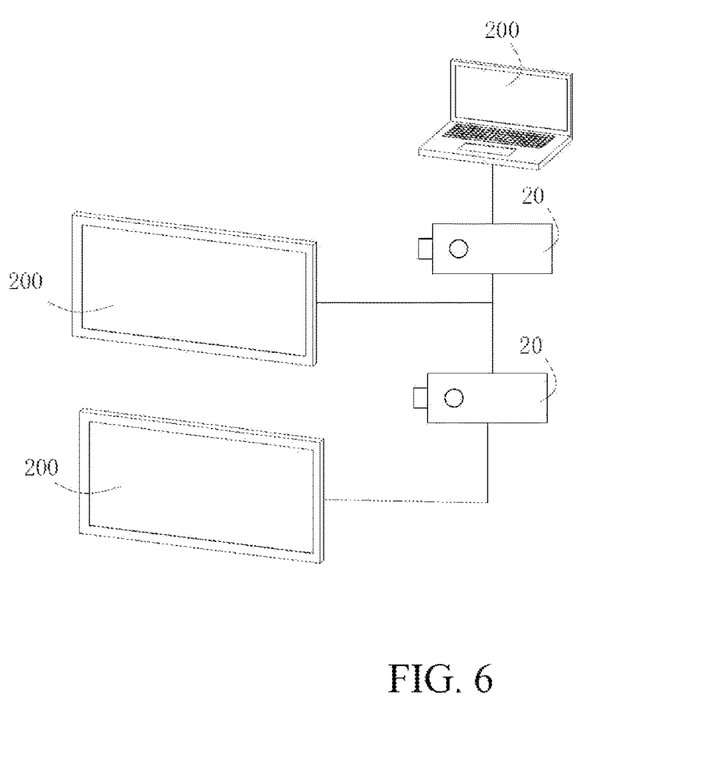
FIG. 6 illustrates the data receivers connecting to different display devices according to the above preferred embodiment of the present invention.

According to the preferred embodiment, the data receiver 20 is detachably connected to the display device 200 to form a receiving terminal. In one embodiment, the display device 200 is embodied as a TV, a projector projecting information on screen, a screen of the personal computer, a screen of the notebook computer, a screen of the smart device, or a screen of the tablet computer. Preferably, two or more data receivers 20 are connected to different display devices 200 respectively, as shown in FIG. 6.

Figure 4:
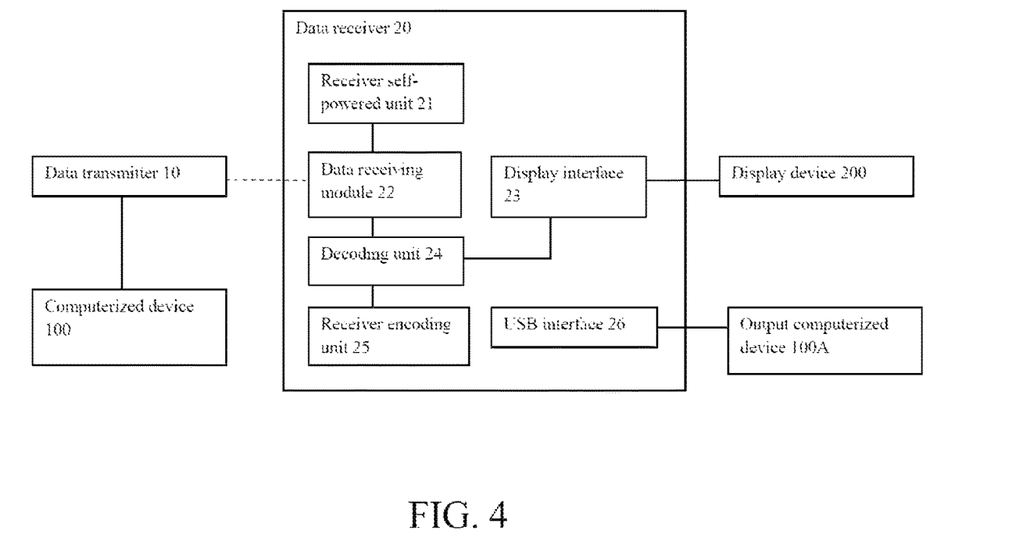
FIG. 4 is a block diagram of a data receiver of the wireless conferencing system according to the above preferred embodiment of the present invention.

As shown in FIG. 4, each of the one or more data receivers 20 comprises a receiver self-powered unit 21, a display interface 23 for detachably connecting to the display device 200, and a data receiving module 22 wirelessly linked to the data transmitter 10 for wirelessly receiving the data from the computerized device 100. The data receiver 20 which is also configured to have a compact size such as thumb size comprises an elongated housing 20A configured to house the receiver self-powered unit 21, the data receiving module 22, and the display interface 23 for transmitting data received from the data transmitter 10 to the display device 200 to display. According to the preferred embodiment, a connecting terminal of the display interface 23 is extended from a first end of the housing 20A of the data receiver 20, as shown FIG. 12. Likewise, the data receiver 20 also is a self-powered receiving device which does not need to draw any electrical power from the display device when operating the data receiver 20. It is worth mentioning that the receiver self-powered unit 21 is optional. Preferably, the data receiver 20 is powered by the display device 200, such that the receiver self-powered unit 21 can be a backup power source of the data receiver 20.

The control base 30 is configured to selectively activate the data transmitter 10 and the data receiver 20 to form a closed private network. In one embodiment, when two or more data transmitters 10 are used at the same time, the control base 30 is configured to activate the data transmitters 10 to join the closed private network. Likewise, when two or more data receivers 20 are used at the same time, the control base 30 is configured to activate the data receivers 20 to join the closed private network. The closed private network can be embodied as a "WiFi" connection, "Bluetooth" connection, "5G" connection, or other wireless connection preferably with encrypted data transmission. In other words, the data can only transmitted between the data transmitters 10 and the data receivers 20 but not other devices.

Figure 1:
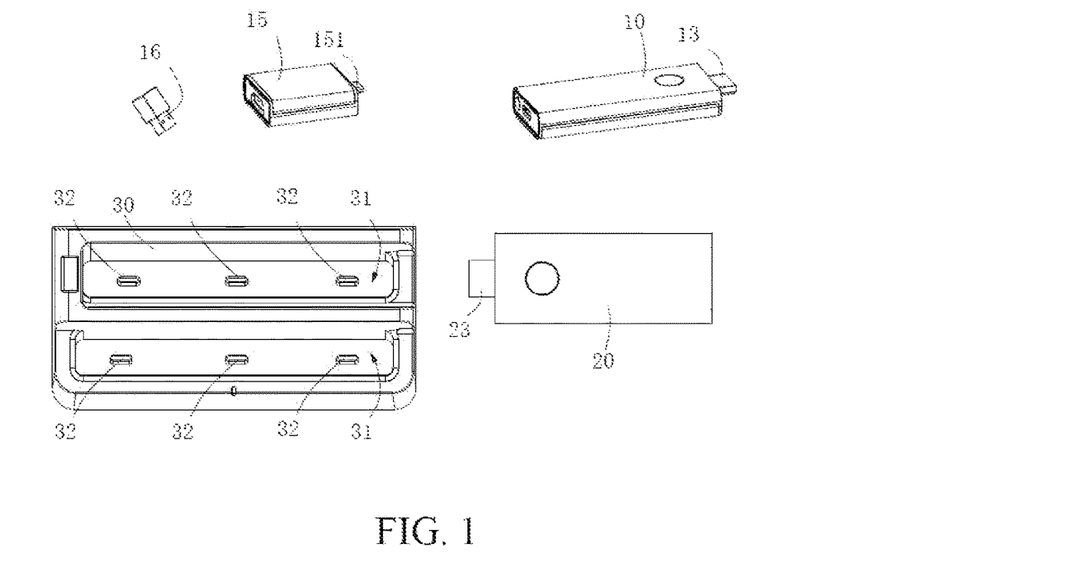
FIG. 1 illustrates a wireless conferencing system according to a preferred embodiment of the present invention.
Figure 5:
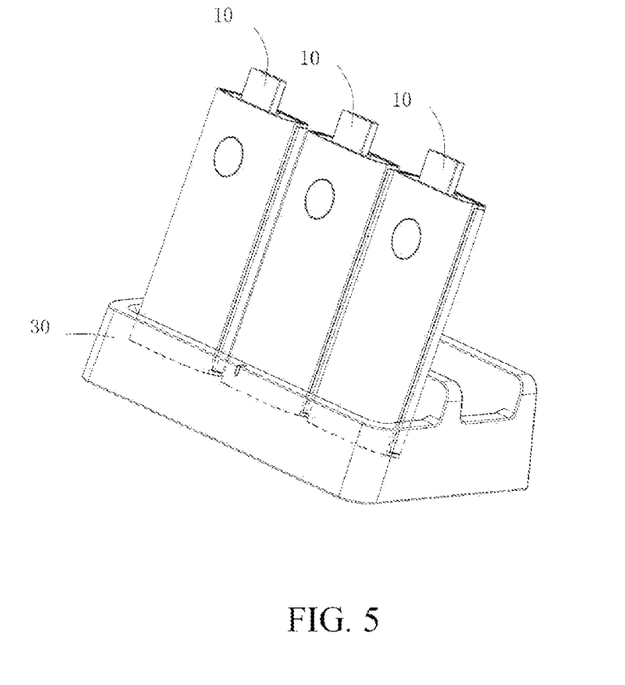
FIG. 5 is a perspective view of the of the wireless conferencing system according to the above preferred embodiment of the present invention, illustrating the data transmitters and the data receivers held at the control base.

According to the preferred embodiment, referring to FIGS. 1-4 and 13A, the control base 30, which comprises a power supply and charging circuit 33 configured for electrically connecting to an external power source 300 and electrically connected to the charging ports 32, serves as a charging station for charging the data transmitters 10 and the data receivers 20. The transmitter self-powered unit 11 is embodied as a rechargeable battery and configured to be charged by the control base 30 when the data transmitter 10 is supported thereon through a power terminal 110 such as a USB port provided at one end of the. Likewise, the receiver self-powered unit 21 is charged by the control base 30 when the data receiver 20 is supported thereon. As shown in FIGS. 1 and 5, the control base 30 comprises a plurality of receiving stations 31 and a plurality of charging ports 32 provided at the receiving stations 31 respectively each for charging the transmitter self-powered unit 11 of the data transmitter 10 and the receiver self-powered unit 21 of the data receiver 20 when the data transmitters 10 and the data receivers 20 are held at the receiving stations 31. Preferably, bottom portions of the data transmitters 10 and bottom portions of the data receivers 20 are held at the receiving stations 31 of the control base 30 as shown in FIG. 5, wherein each of the receiving stations 31 is embodied to have a receiving slot shaped and sized to fittingly receive at least a bottom portion of the data transmitter 10 or the data receiver 20.

According to the preferred embodiment, the transmitter self-powered unit 11 of the data transmitter 10 is preferred to be embodied as a rechargeable battery and a connecting terminal such as USB port 110 of the transmitter self-power unit 11 is provided at a second end of the housing 10A of the data transmitter, such that when the data transmitter 10 is docked and held in the corresponding receiving station 31 of the control base 30, the transmitter self-power unit 11 is charged by the corresponding charging port 32, for example via the connecting terminal of the transmitter self-power unit 11. In addition, the transmitter self-power unit 11 may also configured to be charged by an external battery unit such as a power bank by electrically connecting the external battery unit to the USB port 110 at the second end of the housing 10A of the data transmitter 10 when the data transmitter 10 is not docked in the control base 30 or is connecting with the computerized device 100 for data transmission.

Figure 13A:
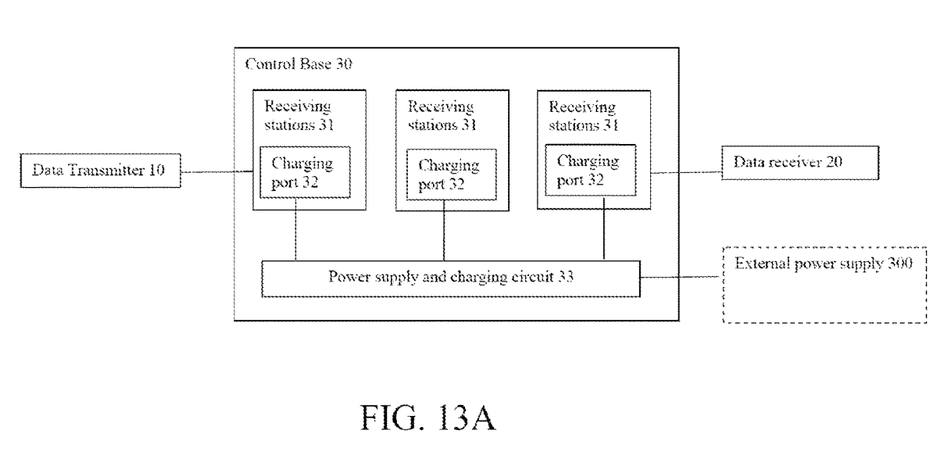
FIG. 13A is a block diagram illustrating the charging arrangement of the control base and the data transmitter and data receiver according to the above preferred embodiment of the present invention.
Figure 13B:
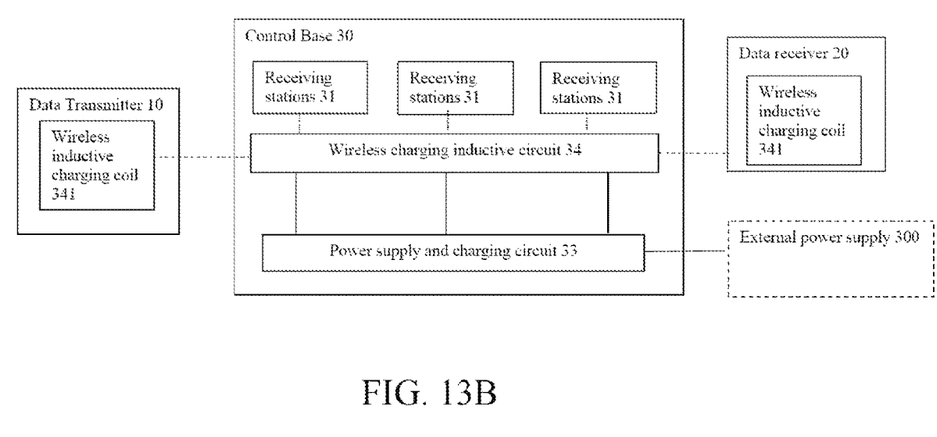
FIG. 13B is a block diagram illustrating an alternative mode of the charging arrangement of the control base and the data transmitter and data receiver according to the above preferred embodiment of the present invention.

It is appreciated that a magnetic engagement unit can be provided for magnetically engaging the data transmitter 10 and/or the data receiver 20 with the receiving stations 31 of the control base 30 so as to facilitate the positioning and retaining of the data transmitter 10 and the data receiver 20 in the corresponding receiving station 31. Furthermore, in one embodiment, referring to FIG. 13B, the control base 30 comprises one or more wireless charging inductive circuits 34 at the receiving stations 31 thereof, and the data transmitter 10 and/or the data receiver 20 may also comprise wireless inductive charging coil 341 therein, such that the data transmitter 10 or the data receiver 20 is wireless charged when it is held in the receiving station 31 of the control base 30 through inductive coupling. In one embodiment, the wireless charging inductive circuit 34 of the control base 30 may be arranged in such a manner that the data transmitter 10 or data receiver 20 is able to be wirelessly charged by the control base 30 when the data transmitter 10 and the data receiver 20 are placed on the control base 30 or even adjacent to the control base 30.

According to the preferred embodiment, referring to FIG. 2, each of the one or more data transmitters 10 further comprises a built-in encoding unit 14 electrically powered by the transmitter self-powered unit 11 for encoding the data before transmitting. When the computer interface 11 is connected to the computerized device 100, the data is acquired from the computerized device 100 and is encoded by the encoding unit 14. Then, the encoded data is wirelessly transmitted to the data receiver 20 via the wireless connection between the data transmission module 12 and the data receiving module 22.

Correspondingly, each of the one or more data receivers 20 further comprises a built-in decoding unit 24 electrically powered by the receiver self-powered unit 21 or the display device 200 for decoding the data transmitted from the data transmission module 12. In other words, the decoding unit 21 is configured to decode the encoded data transmitted from the data transmitter 10.

It is worth mentioning that the encoding-decoding operation is performed by the paired data transmitter 10 and the data receiver 20, such that the computerized device 100 to be operated with the present invention does not require pre-installing any encoding-decoding software. In other words, the data transmitter 10 and the data receiver 20 of the present invention are capable of working with any computerized device 100. Therefore, after the data transmitter 10 and the data receiver 20 are paired, the data transmitter 10 and the data receiver 20 are plug-and-play devices without any pre-installing software.

As shown in FIGS. 1 and 2, each of the one or more data transmitters 10 further comprises an interface adapter 15 configured to be detachably coupled at the computer interface 13 to alter a connection interface. In one embodiment, the computer interface 13 of the data transmitter 10 is a HDMI interface connecting to a HDMI port of the computerized device 100. Accordingly, the interface adapter 15 comprises an alternative computer interface 151 serving as an alternative interface to connect to the computerized device 100. In one embodiment, the alternative computer interface 151 is a USB interface connecting to a USB port of the computerized device 100. In other words, when the interface adapter 15 is detachably coupled at the computer interface 13, the data transmitter 10 is converted from the HDMI interface to the USB interface.

The interface adapter 15 may further comprise a power supply 152 configured to be able to charge the transmitter self-powered unit 11 of the data transmitter 10 when the interface adapter 15 is coupled at the data transmitter 10. According to the preferred embodiment, the computer interface 13 is extended from the first end of the elongated housing 10A of the data transmitter 10. When the interface adapter 15 is detachably coupled at the computer interface 13, the data transmitter 10 is converted from the HDMI interface to the USB interface and at the same time the transmitter self-powered unit 11 is charged by the power supply 152.

When the interface adapter 15 is detachably coupled at the second end of the elongated housing 10A of the data transmitter 10, the data transmitter 10 provides the HDMI interface and at the same time the transmitter self-powered unit 11 is charged by the power supply 152. It is worth mentioning that, similar to the data transmitter 10 and the data receiver 20, the power supply 152 of the interface adapter 15 is preferred to be embodied as a rechargeable battery and configured to be charged by the control base 30 while the interface adapter 15 is held in the corresponding receiving station 31 of the control base 30.

In other words, the connecting terminal 110 provided the second end of the elongated housing 10A of each of the data transmitters 10 is adapted to couple with the alternative computer interface 151 of the interface adapter 15. Preferably, the USB port 110 is a USB type C port.

Figure 8:
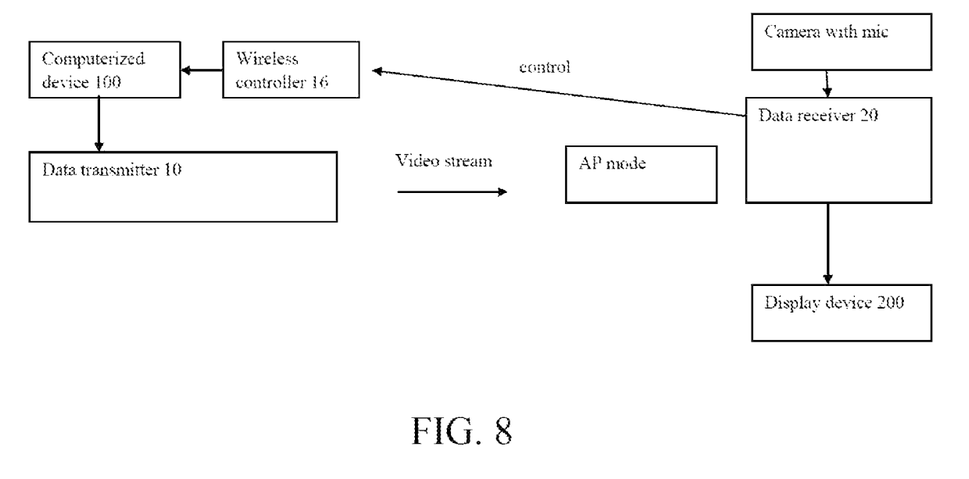
FIG. 8 is a block diagram illustrating the data transmission of the wireless conferencing system according to the above preferred embodiment of the present invention.

According to the preferred embodiment, the communicative connection between the data transmitter 10 and the data receiver 20 is not unidirectional. In other words, the data transmitter 10 not only transmits data to the data receiver 20 but also received data from the data receiver 20, as shown in FIG. 8. Particularly, the data receiver 20 is configured to send a control signal to the data transmitter 10 when the computerized device 100 or display device 200 is a touch-screen control device. By touching the screen of the computerized device 100 or display device 200, the control signal is generated and sent from the data receiver 20 to the data transmitter 10 for controlling the computerized device 100. For example, by drag the finger on the screen of the display device 200 from side to side to generate the control signal of "turning to the next page", the data transmitter 10 receives the control signal to control the computerized device 100 for generating the data of "next page" to be displayed on the display device 200.

In order to effectively transmit the control signal from the data receiver 20 to the data transmitter 10, the data transmitter 10 further comprises a wireless controller 16 wirelessly connecting to the data receiver 20 to receive the control signal therefrom. It is worth mentioning that the wireless controller 16 is not a device for wireless connection. The wireless controller 16 is only configured to receive the control signal from the data receiver 20. In one embodiment, the wireless controller 16 is an individual controller detachably connecting to the computerized device 100, such as through USB connection. In other words, the computerized device 100 requires two individual ports, such as HDMI port and USB port, for connecting the computer interface 13 and the wireless controller 16 respectively. Alternatively, the wireless controller 16A can be built-in with the housing of the data transmitter 10 to form a one single unit, such that the computerized device 100 requires only one port, such as USB port, for connecting the computer interface 13.

According to the preferred embodiment, the data transmitter 10 is able to serve as a laser pointer 10A and a remoter controller 10B when two or more of the data transmitters 10 are used.

Figure 9:
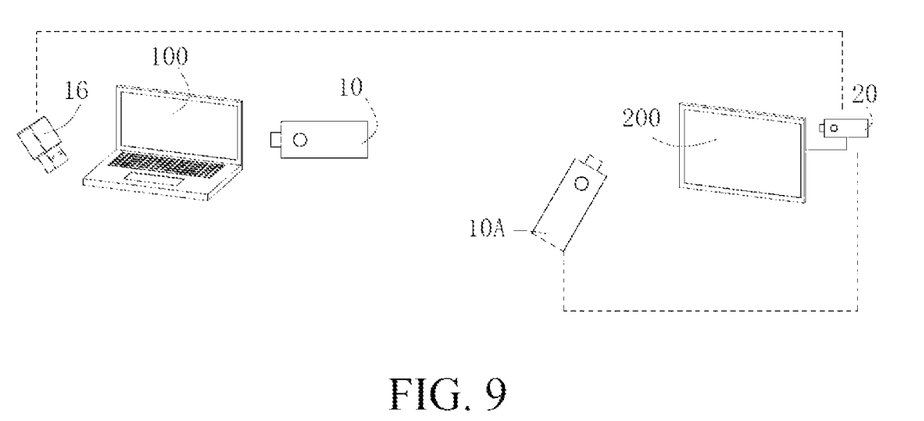
FIG. 9 is a block diagram illustrating the data transmitter functioning as a laser pointer according to the above preferred embodiment of the present invention.

In one configuration of the laser pointer 10A, as shown in FIG. 9, two data transmitters 10 are incorporated with each other to the data receiver 20. One of the data transmitters 10 is connected to the computerized device 100 for transmitting the date to the data receiver 20. Another one of the data transmitter 10A serves as the laser pointer 10A wirelessly connecting to the wireless controller 16, 16A through the data receiver 20. When the laser pointer 10A is configured to transmit a pointer signal as the control signal to the data receiver 20, the data receiver 20 transmits the pointer signal to the data transmitter 10 via the wireless controller 16 for controlling the computerized device 100 and for creating a pointer on the display device. It is worth mentioning that the wireless controller 16, 16A can be an individual device or a built-in device. As shown in FIG. 9, the wireless controller 16 is the individual device.

Figure 10:
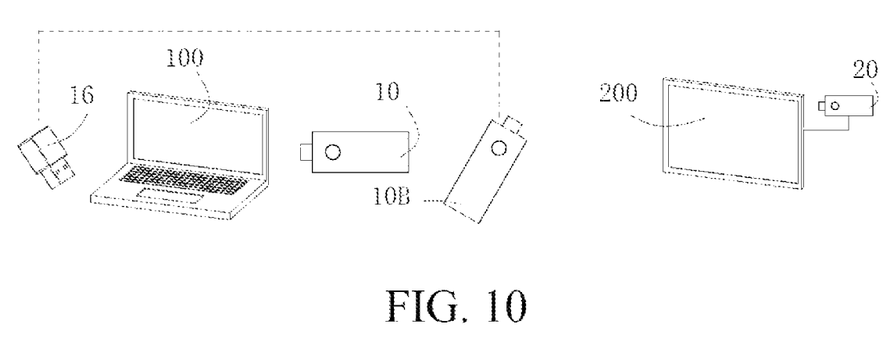
FIG. 10 is a block diagram illustrating the data transmitter functioning as a remote controller according to the above preferred embodiment of the present invention.

In one configuration of the remoter controller 10B, as shown in FIG. 10, two data transmitters 10 are incorporated with each other to the data receiver 20. One of the data transmitters 10 is connected to the computerized device 100 for transmitting the date to the data receiver 20. Another one of the data transmitter 10B serves as the remote controller 10B wirelessly connecting to the data transmitter 10 through the wireless controller 16. When the remoter controller 10B is configured to transmit a remote controlling signal to the data transmitter 10, the remote controller 10B is configured for remotely controlling the computerized device 100. As shown in FIG. 10, the wireless controller 16 is the individual device.

According to the preferred embodiment, two or more of the data receivers 20 can be incorporated with each other to wirelessly connect to two or more data transmitters 10. In one configuration, the data receivers 20 are wirelessly connected with the data transmitter 10 via the closed private network to form a display group, wherein when one or more of the data receivers 20 are connected to the one or more display devices 200 respectively, the dater transmitter 10 transmits the data to the data receivers 20 at the same time, such that the data will be concurrently displayed on the display devices 200.

Figure 7:
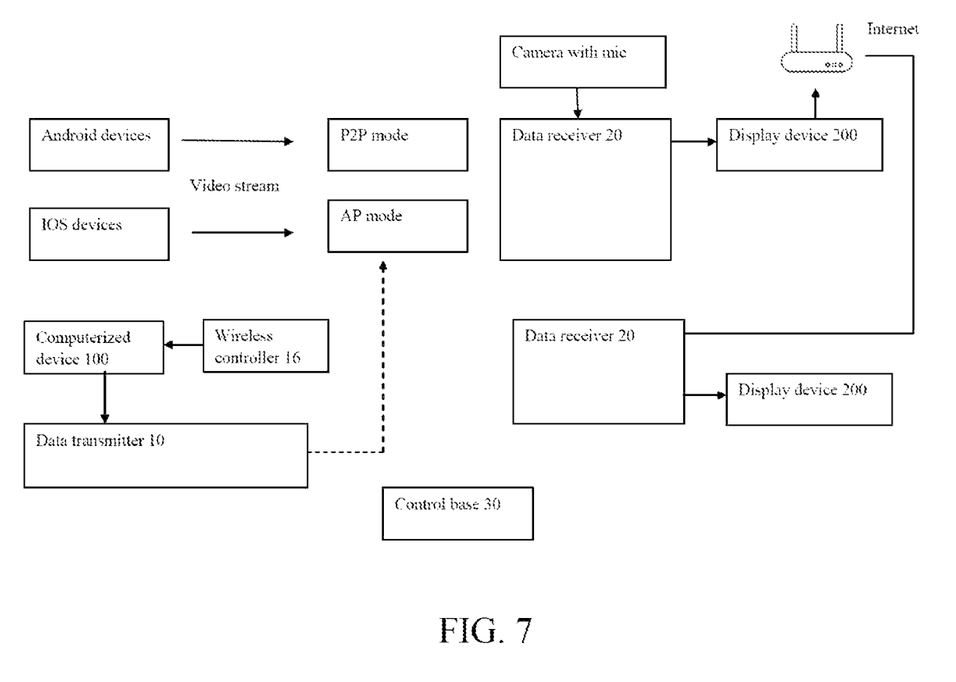
FIG. 7 is a block diagram illustrating the structural configuration of the wireless conferencing system according to the above preferred embodiment of the present invention.

In another configuration, as shown in FIG. 7, one of the data receivers 20 is wirelessly linked to the data transmitter 10 via the closed private network and is arranged for connecting to one of the data receivers 20 via a wireless network different from the closed private network. In other words, the data receivers 20 are interconnected with each other via the wireless network. Only one of the data receivers 20 is wirelessly connected to the data transmitter 10 via the closed private network. Therefore, for example, the data receiver 20 serves as a host data receiver when connecting to the data transmitter 10 via the closed private network, while the other data receiver 20 serves as a slave data receiver when connecting to another data receiver 20 via the wireless network.

Figure 12:
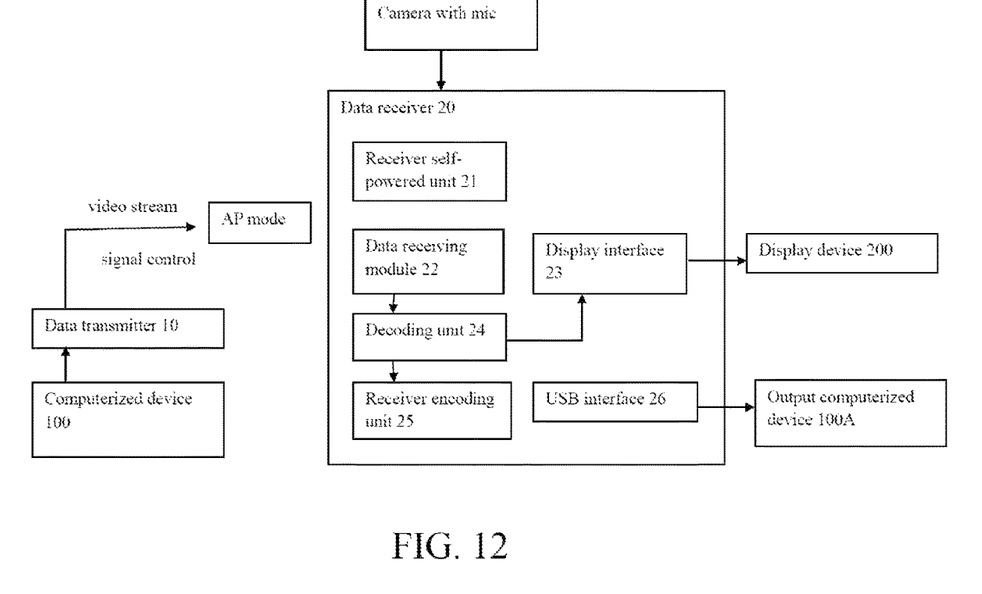
FIG. 12 is a block diagram illustrating the data transmission of the wireless conferencing system among different computerized devices and display device according to the above preferred embodiment of the present invention.

During the conference, data will be shared through different computerized devices 100. Accordingly, the data receiver 20 is adapted to connect to the computerized device 100 to share and/or display the data transmitted from the data transmitter 10. As shown in FIG. 12, each of the data receivers 20 is preferred to further comprise a receiver encoding unit 25 encoding the data from the built-in decoding unit 24, and a USB interface 26 configured for connecting an output computerized device 100A to transmit data from the receiver encoding unit 25 to the output computerized device 100A. Preferably, the USB interface 26 of the data receiver 20 is a UVC/UAC USB for connecting to the output computerize device. Such configuration is especially for live broadcasting and for creating a platform for conference.

Figure 11:
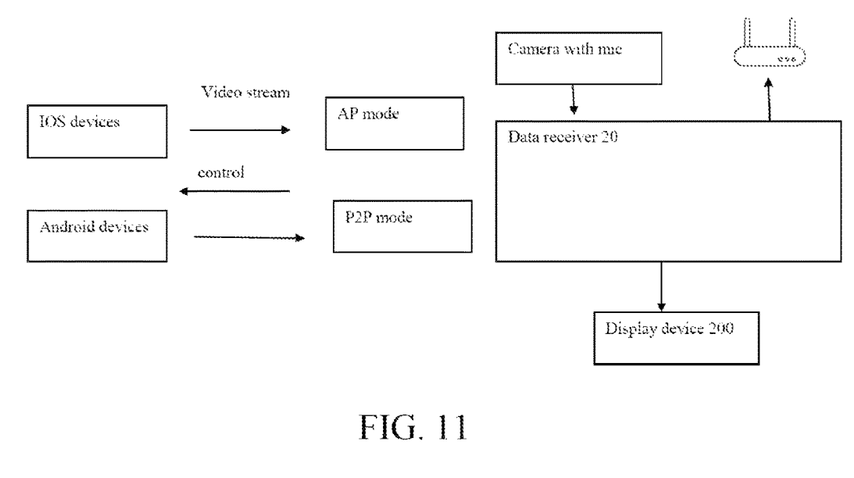
FIG. 11 is a block diagram illustrating the data transmission of the wireless conferencing system via a mobile device according to the above preferred embodiment of the present invention.

Accordingly, the wireless conferencing system of the present invention can be incorporated with different computerized devices 100, such personal computer, notebook computer, tablet computer, mobile phones, and etc., with different operation systems. For the personal computer, notebook computer, and tablet computer, the data transmitter 10 can be directly connected to these computerized devices 100. For the mobile phone or tablet, the data receiver 20 can be wirelessly connected to the mobile phone for steaming the data therefrom. Accordingly, there are two mainstreams of the operation systems for the mobile phone, i.e. "IOS" and "Android".

According to the preferred embodiment, the data receiver 20 is configured to be operated between an AP (access point) working mode and a P2P (peep-to-peep) working mode for ensuring a real-time data transmitting between the data transmitter 10 and the data receiver 20. In one configuration, the working modes are configured for wirelessly communicating with different operation systems of the computerized devices 100. Particularly, the data receiver 20 is set at the AP working mode configured for ISO device and for connecting the data transmitter 10, and is set at the P2P working mode especially configured for Android device. It is worth mentioning that the AP working mode and the P2P working mode can be concurrently set for real-time data transmission.

As it is mentioned above, the data transmitter 10 is a self-powered transmitting device which does not draw any electrical power from the computerized device 100 when operating the data transmitter 10 therewith. The data transmitter 10 further comprises a low battery warning unit 17 electrically connected to the transmitter self-powered unit 11 for generating a low battery warning signal when a power level of the transmitter self-powered unit 11 is below a preset threshold. In one embodiment, the low battery warning unit 17 can be a LED unit configured for generating a light signal as the low battery warning signal. When the low battery warning signal is generated, the user is able to recharge the transmitter self-powered unit 11 by connecting the interface adapter 15 to the data transmitter 10 or connecting the external battery unit to the data transmitter 10. Alternatively, the low-battery data transmitter 10 can be disconnected or unplugged from the computerized device 100 for disconnecting the data receiver 20 and can be placed at the control base 30 for re-recharging, wherein a fully charged data transmitter 10 can be connected or plugged to the computerized device 100 to wirelessly connect to the data receiver 20 for continuously transmitting the data to the data receiver 20. It is worth mentioning that when the data transmitter 10 is disconnected from the computerized device 100 for disconnecting the data receiver 20, the data receiver 20 is configured for saving the last data displayed on the display device. In other words, when the data transmitter 10 is powered off, the last screen on the display device will be saved and remained on the display device until new data is received by the data receiver 20 from another data transmitter 10 connected to the computerized device 100.

Accordingly, the present invention further comprises a conferencing collaboration method, comprising the following steps.

(A) Connect the data transmitter 10 to the computerized device 100 to form a transmitting terminal by the following steps.

(A.1) Connect the computer interface 13 of the data transmitter 10 to the computerized device 100.

(A.2) Power the data transmission module 12 of the data transmitter 10 by the transmitter self-powered unit 11 thereof.

(A.3) Generate the low battery warning signal by the data transmitter 10 when a power level of the transmitter self-powered unit 11 is below a preset threshold.

(B) Via the data transmission module 12, wirelessly transmit data from the computerized device 100 to the display device 200 without consuming power of the computerized device 100.

(C) Connect the data receiver 20 to the display device to form a receiving terminal by the following steps.

(C.1) Connect the display interface 23 of the data receiver 20 to the display device 200.

(C.2) Power the data receiving module 22 of the data receiver 20 by the receiver self-powered unit 21 thereof or by the display device 200 to receive the data transmitted from the data transmission module 12 of the data transmitter 10.

In one embodiment, the step (C) further comprises the step:

(C.3) Save the last data displayed on the display device 200 by the data receiver 20 when the data transmitter 10 is powered off or detached from the computerized device 100.

When the display device is the touch-screen control device, the display device 200 is able to generate the control signal. The step (C) further comprises the step of (C.4) sending the control signal form the data receiver 20 to the data transmitter 10 for controlling the computerized device 100 from the display device.

In order to share and/or display the data to another computerized device 100, i.e. the output computerized device 100A, the step (C) further comprises the following steps.

(C.1') Connect the USB interface 26 of the data receiver 20 to the output computerized device 100A.

(C.2') Encode the data from the built-in decoding unit 24 by the receiver encoding unit 26 of the data receiver 20 to transmit data from the receiver encoding unit 26 to the output computerized device 100A.

Accordingly, in order to pair the data transmitter 10 with the data receiver 20, before the step (a), the method further comprises a pre-step of:

selectively activating the data transmitter 10 and the data receiver 20 to form the closed private network by the control base 30, wherein the activation of each of the data transmitter 10 and the data receiver 20 can be touch buttons on the control base 30.

The transmitter self-powered unit 11 of the data transmitter 10 is charged by the following charging steps.

(1) Charge the transmitter self-powered unit 11 by the control base 30 by placing the data transmitter 10 thereon when the data transmitter 10 is not connected to the computerized device 100.

(2) Charge the transmitter self-powered unit 11 by the external battery unit when the data transmitter 10 is connected to the computerized device 100.

(3) Charge the transmitter self-powered unit 11 by the interface adapter 15 when the data transmitter 10 is connected to the computerized device 100.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A wireless conferencing system for wirelessly connecting at least one computerized device with at least one display device, comprising:

one or more data transmitters, each of said one or more data transmitters comprising:
a transmitter self-powered unit,
a data transmission module electrically powered by said transmitter self-powered unit, and
a computer interface communicatively lined to said data transmission module, wherein when said computer interface is configured for detachably connecting to the computerized device, said data transmission module is powered and ready for wirelessly transmitting data from the computerized device to the display device without consuming power of the computerized device; and one or more data receivers, each of said one or more data receivers comprising:
a display interface for detachably connecting to the display device, and
a data receiving module wirelessly linked to said one or more data transmitters for wirelessly receiving the data from the computerized device.

2. The wireless conferencing system, as recited in claim 1, further comprising a control base selectively activating said one or more data transmitters and said one or more data receiver to form a closed private network.

3. The wireless conferencing system, as recited in claim 2, wherein said transmitter self-powered unit of each of said one or more data transmitters is charged by said control base when each of said one or more data transmitters is supported thereon, and is configured for being charged by an external battery unit when each of said one or more data transmitters is connected to the computerized device.

4. The wireless conferencing system, as recited in claim 2, wherein each of said one or more data transmitters further comprises a built-in encoding unit electrically powered by said transmitter self-powered unit for encoding the data before transmitting, wherein each of said one or more data receivers further comprises a built-in decoding unit that decodes the data transmitted from said data transmission module.

5. The wireless conferencing system, as recited in claim 4, wherein each of said one or more data receivers further comprises a receiver encoding unit encoding the data from said built-in decoding unit, and a USB interface configured for connecting an output computerized device to transmit data from said receiver encoding unit to the output computerized device.

6. The wireless conferencing system, as recited in claim 2, wherein each of said one or more data transmitters further comprises an interface adapter detachably coupled at said computer interface to alter a connection interface.

7. The wireless conferencing system, as recited in claim 6, wherein said interface adapter of each of said one or more data transmitters comprises a power supply and an alternative computer interface, wherein when said interface adapter is coupled at said computer interface, said self-powered unit is recharged by said power supply of said interface adapter.

8. The wireless conferencing system, as recited in claim 2, wherein each of said one or more data receivers is configured to send a control signal to said one or more data transmitters when the display device is a touch-screen control device.

9. The wireless conferencing system, as recited in claim 2, wherein when two or more of said one or more data transmitters are provided, one of said one or more data transmitters is arranged for connecting to the computerized device as a transmitting terminal thereof while one of said one or more data transmitters serves as a laser pointer, wherein when said laser pointer is configured to transmit a pointer signal to said data receiver, said data receiver transmits said pointer signal to said one or more data transmitters for controlling the computerized device and for creating a pointer on the display device.

10. The wireless conferencing system, as recited in claim 2, wherein when two or more of said one or more data transmitters are provided, one of said one or more data transmitters is arranged for connecting to the computerized device as a transmitting terminal thereof while another one of said one or more data transmitters serves as a remote controller, wherein when said remoter controller is configured to transmit a remote controlling signal to said one or more data transmitters, said remote controller is configured for remotely controlling the computerized device.

11. The wireless conferencing system, as recited in claim 2, wherein when two or more data receivers are provided, one of said two or more data receivers is wirelessly linked to said one or more data transmitters via said closed private network and is arranged for connecting to one of said one or more data receivers via a wireless network different from said closed private network.

12. The wireless conferencing system, as recited in claim 2, wherein at least one of said one or more data receivers is configured to be operated between an AP (access point) working mode and a P2P (peep-to-peep) working mode for ensuring a real-time data transmitting between said one or more data transmitters and said one or more data receivers.

13. The wireless conferencing system, as recited in claim 2, wherein said control base has one or more receiving stations and one or more charging ports provided at said one or more receiving stations respectively for charging said one or more transmitter self-powered units of said one or more data transmitters when said one or more data transmitters are held at said receiving stations of said control base.

14. A conferencing collaboration method for wirelessly connecting at least one computerized device with a display device, comprising steps of:

(a) connecting a data transmitter to the computerized device to form a transmitting terminal by steps of:
(a.1) connecting a computer interface of said data transmitter to the computerized device, and
(a.2) powering a data transmission module of said data transmitter by a transmitter self-powered unit thereof;
(b) via said data transmission module, wirelessly transmitting data from the computerized device to the display device without consuming power of the at least one computerized device; and
(c) connecting a data receiver to the display device to form a receiving terminal by steps of:
(c.1) connecting a display interface of said data receiver to the display device, and
(c.2) powering a data receiving module of said data receiver to receive the data transmitted from said data transmission module of said data transmitter.

15. The conferencing collaboration method, as recited in claim 14, before the step (a), further comprising a step of:
selectively activating said data transmitter and said data receiver to form a closed private network by a control base.

16. The conferencing collaboration method, as recited in claim 15, wherein said transmitter self-powered unit is charged by one of steps of
charging said transmitter self-powered unit by said control base when said data transmitter is supported thereon, and
charging said transmitter self-powered unit by an external battery unit when said data transmitter is connected to the at least one computerized device.

17. The conferencing collaboration method, as recited in claim 15, wherein the step (a) further comprises a step of encoding the data before transmitting by a built-in encoding unit of said data transmitter, wherein the step (c) further comprises a step of decoding the data transmitted from said data transmission module by a built-in decoding unit of said data receiver.

18. The conferencing collaboration method, as recited in claim 17, wherein the step (c) further comprises steps of:
connecting a USB interface of said data receiver to an output computerized device, and
encoding the data from said built-in decoding unit by a receiver encoding unit of said data receiver to transmit data from said receiver encoding unit to the output computerized device.

19. The conferencing collaboration method, as recited in claim 15, wherein the step (a) further comprises a step of detachably coupling an interface adapter at said computer interface to alter a connection interface.

20. The conferencing collaboration method, as recited in claim 19, wherein said interface adapter comprises a power supply and an alternative computer interface, wherein when said interface adapter is coupled at said computer interface, said self-powered unit is recharged by said power supply of said interface adapter.

21. The conferencing collaboration method, as recited in claim 15, wherein the step (c) further comprises a step of sending a control signal form said data receiver to said data transmitter when the display device is a touch-screen control device.

22. The conferencing collaboration method, as recited in claim 15, further comprising a step of configuring said data transmitter as a laser pointer, wherein when said laser pointer is configured to transmit a pointer signal to said data receiver, said data receiver transmits said pointer signal to another data transmitter for controlling the at least one computerized device and for creating a pointer on the display device.

23. The conferencing collaboration method, as recited in claim 15, further comprising a step of configuring one of said data transmitter as a remote controller, wherein when said remoter controller is configured to transmit a remote controlling signal to said data transmitter, said remote controller is configured for remotely controlling the computerized device.

24. The conferencing collaboration method, as recited in claim 15 wherein, in the step (a), when two or more of said data transmitter are connected to the at least one computerized device and one or more another computerized devices respectively, the data transmitted from one of said data transmitters are shared to the one or more another computerized devices, and the data transmitted from said two or more data transmitters are shared to be displayed on the display device.

25. The conferencing collaboration method as recited in claim 15, wherein, in the step (c), when one or more another data receivers are further provided, one of said data receiver and said one or more another data receivers is wirelessly linked to said data transmitter via said closed private network and is arranged for connecting to one of said data receiver and said one or more another data receivers via a wireless network different from said closed private network.

26. The conferencing collaboration method, as recited in claim 15, further comprising a step of configuring said data receiver to be operated between an AP (access point) working mode and a P2P (peep-to-peep) working mode for ensuring a real-time data transmitting between said data transmitter and said data receiver.

27. The conferencing collaboration method, as recited in claim 15, wherein the step (c) further comprises a step of saving the last data displayed on the display device by said data receiver when said data transmitter is either powered off or detached from the at least one computerized device.

28. The conferencing collaboration method, as recited in claim 15, wherein the step (a) further comprises a step of generating a low battery warning signal by said data transmitter when a power level of said transmitter self-powered unit is below a preset threshold.

* * * * *